DIFFERENTIAL CALORIMETER

Filed Oct. 29, 1964

INVENTOR.
Kenneth Arthur Sherwin
BY
Wenderoth, Lind & Ponack
ATTORNEYS 3,314,288
Patented Apr. 18, 1967

3,314,288

DIFFERENTIAL CALORIMETER

Kenneth Arthur Sherwin, Ipswich, Suffolk, England, assignor to Fisons Fertilizers Limited Filed Oct. 29, 1964, Ser. No. 407,495
Claims priority, application Great Britain, Nov. 2, 1963, 43,334/63
11 Claims. (Cl. 73—190)

Figures 1, 2:
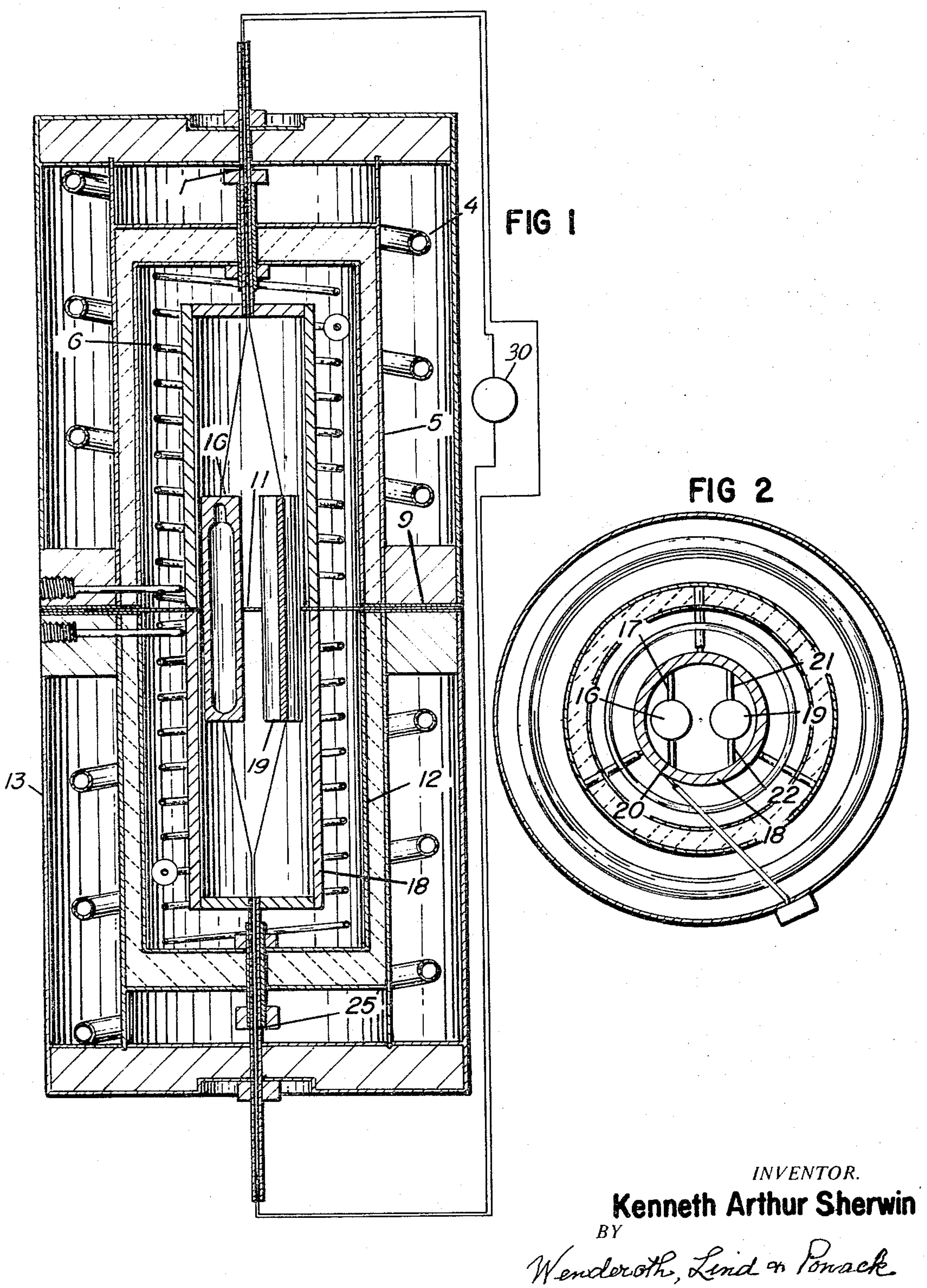

The present invention relates to a calorimeter for enthalpy analysis.

Characterisation of substances by their thermal properties as indicated by the temperature arrest points during heating or cooling has in general lacked a basis on which reliable measurement of the heat quantities can be derived. The apparatus of the present invention is capable of tracing a function of heat flux or a function of temperature against time for a given sample and from this trace enthalpy changes can be measured.

Accordingly the present invention is for a calorimeter comprising two cylindrical cells in apposition made of a heat conducting metal A, a cylindrical shell made of the same heat conducting metal A within which the two cells are positioned, means for heating or cooling the shell, fins made of a metal B connecting the cells with the shell and a galvanometer connected electrically in series with each of the cells, the galvanometer being capable of detecting a thermal electromotive force developed as a result of temperature gradients existing in the fins.

Essentially metal A will be characterised by a high thermal capacity and is preferably copper. Metal B will be a metal having little change in resistivity over a range of temperatures and is preferably constantan.

The cylindrical shell may be heated by radiant heat from a surrounding unit.

The two cylindrical cells are adapted to contain respectively the sample under investigation and a reference body of similar heat capacity.

The calorimeter of the present invention is illustrated in the accompanying drawings in which FIGURE I is a vertical section and in which FIGURE II is a plan section.

Referring to the drawings two copper cells 16 and 19 are joined by constantan fins 17, 20, 21 and 22 to a copper shell 18.

A tin plate reflecting shield 12 and a thin copper shield 5 surround and insulate the copper shell 18. Between the reflecting shield 12 and the copper shell 18 is provided a heating coil 6 and between copper shield 5 and a tin plate casing 13 is provided a cooling tube 4 through which coolant can be passed. The whole is contained in the tin plate casing 13. Tubes 1 and 25 carry leads to a galvanometer not shown.

The principal thermal connection between cells 16 and 19 and shell 18 is by way of the constantan fins 17, 20, 21 and 22 which extend the full length of the cells to form parallel heat leakage paths. The peripheral gradients round the copper cell are negligible, whereas gradients will normally exist in the fins and give rise to thermal electromotive forces at the copper junctions.

As illustrated the calorimeter has been constructed in two symmetrical halves to facilitate the introduction and removal of samples. The copper cells 16 and 19 and the copper shell 18 are separated by a mica diaphragm 11 and the shieds 5 and 12 and casing 13 are separated by an asbestos paper ring 9.

Variations in convection are discouraged by keeping the air spaces small. Temperature gradients within the sample and container are kept low by using the smallest practicable diameters and appropriate rates of heating. End effects have been reduced as far as possible by choosing a length to diameter ratio of 8:1. Gradients in the envelope are minimised by the use of radiant heat from the free standing coil 6.

In operation the sample being examined is placed in copper cell 16 and a suitable standard is placed in copper cell 19. The temperature of copper shell 18 is then raised by means of heating coil 6 at the rate of about 1° C. to 3° C. per minute. Depending on the characteristics of the sample compared with the standard a temperature difference is set up between cell 16 and cell 19 and between the cells and shell 18 which causes a thermal electromotive force to be set up in the circuit comprising cells 16 and 19, constantan fins 17, 20, 21 and 22 and shell 18. If the sample exhibits an endothermal transition at a given temperature the sample will tend to remain at the temperature until all the heat has been transferred and will give rise to an increased temperature differential which will be registered as a corresponding deflection on the galvanometer 30.

The principles on which the operation of the calorimeter is based may be expressed as follows:

Let—

$T_1T_2$ be the temperatures at the junctions of cells 16 and 19 with the constantan fins.

$T_3$, the temperature of the envelope 18 $u_1u_2$, the heat capacities of the cells and contents, but excluding the sample.

$u$, the effective heat capacity of the sample in cell 1

$$u=f\ (T_1)$$

$P_1P_2$, the thermal conductance between the cells and the envelope 18.

$p$, the thermal conductance directly between cell 16 and cell 19.

$\Delta$, deflection of galvanometer at time $t$ due to presence of specimen.

Means are provided for progressively raising or lowering the temperature $T_3$. For greater convenience in interpreting the results of experiment the rate $dT_3/dt$ is controlled at a uniform value $m$ throughout the temperature range of interest. Satisfactory results are obtained if $m$ is $+3°$ or $\pm 1°$ centigrade per minute, by reference to the resistance of a platinum winding on the envelope 18.

In the steady state;

$$T_1-T_2=\frac{-m(u_1p_2-u_2p_1)}{p_1p_2+p(p_1+p_2)}$$

The $p$ values remain constant between successive runs; $u_2$ is kept constant at a selected value approximating $u_1+u$, thereby contributing a signal which tends to cancel deflections arising from irregularities in the rate of heating. The sample when under test is contained in cell 1 and contributes a component $u=f(T_1)$ which is characteristic of the heat capacity of the sample. Successive traces are obtained $\Delta_1$ with an empty glass phial, and $\Delta_2$ with specimen.

It can be shown that in the steady state $$\Delta=\Delta_1-\Delta_2=u(a+2bT)\frac{mr_1}{gu_1}=uk$$

where constants $a$ and $b$ refer to the thermal E.M.F.-temperature characteristic, and $g$ is a galvanometer constant, and $T_1$ is defined below.

The temperature-dependent coefficient $k$ is determined by calibration using a copper specimen or by Joule effect.

When $u$ is varying or discontinuous, the variations displayed by $\Delta_2$ can be interpreted by considering the cell 16 as a ballistic calorimeter in which the apparent time constant $$\frac{u_1}{p_1p_2+p(p_1+p_2)}=r_1$$

is approximately 115 seconds, which permits a graphical correction to be made to $\Delta$ to derive the instantaneous rate of heat transfer to the specimen. Visual interpretation is usually sufficient to identify the type of phenomenon in play.

Calibrations show that the value of Δ corresponding to unit heat flux ($mu=1$) falls by 5.7% per 100°. This can be allowed for in deducing enthalpy changes from the area enclosed by Δ; as expressed by $$h''-H'=\frac{1}{K}\int_{T_1'}^{T_2''}\Delta dt$$

where $T_1'+T'$ are limiting values of $T_1$ and H'H'' the respective sample enthalpies. This expression is correct providing $\Delta'=\Delta''$, but in many cases this difference can be neglected.

A time switch is provided which intercepts the traces Δ' and Δ'' to show a deflection characterising the temperature T. The sample temperature has been found to lag 1.7° behind $T_1$ when $m=1°$/min. from which transition temperatures can be accurately deduced.

The calorimeter of the present invention can be used both qualitatively and quantitatively. Qualitatively it can be used to detect induced isothermal transistions, cessation of phenomena, transitions spread over a wide temperature range such as dehydration, exothermal changes, supercooling and the like. Quantitatively it can be used to measure enthalpies.

I claim:

1. A differential calorimeter comprising two cylindrical cells in apposition made of a heat conducting metal A having a high thermal capacity, a cylindrical shell made of the same heat conducting metal A and within which the two cells are symmetrically positioned, means for altering the heat content of the cylindrical shell uniformly, fins made of a metal B connecting the cells with the shell, said metal B having little change in resistivity over a range of temperature, and a galvanometer connected electrically in series with each of the cells, the galvanometer being capable of detecting a thermal electromotive force developed as a result of temperature gradients existing in the fins.

2. A differential calorimeter according to claim 1 in which said metal A is copper and said metal B is constantan.

3. A differential calorimeter according to claim 1 in which said fins extend the length of said cells.

4. A differential calorimeter comprising two cylindrical cells in apposition made of a heat conducting metal A having a high thermal capacity, a cylindrical shell made of the same heat conducting metal A and within which the two cells are symmetrically positioned, fins made of a metal B connecting the cells with the shell, said metal B having little change in resistivity over a range of temperatures, a heating coil surrounding said cylindrical shell uniformly to heat said shell by radiant heat, and a galvanometer connected in series with each of the cells, the galvanometer being capable of detecting a thermal electromotive force developed as a result of temperature gradients existing in the fins.

5. A differential calorimeter according to claim 4 in which said metal A is copper and said metal B is constantan.

6. A differential calorimeter according to claim 4 in which said fins extend the length of said cells.

7. A differential calorimeter according to claim 4 constructed in two symmetrical halves.

8. A differential calorimeter comprising in apposition two cylindrical cells having a length to diameter ratio of about 8:1, said cells being made of a heat conducting metal A having a high thermal capacity, a cylindrical shell made of the same heat conducting metal A and within which the two cells are symmetrically positioned, fins made of a metal B connecting the cells with the shell, said metal B having little change in resistivity over a range of temperatures, a heating coil connected to a source of electric current and surrounding said cylindrical shell to heat the shell uniformly by radiant heat, a radiant heat shield surrounding said heating coil, a cooling tube surrounding said radiant heat shield, and a galvanometer connected in series with each of the cells, the galvanometer being capable of detecting a thermal electromotive force developed as a result of temperature gradients existing in the fins.

9. A differential calorimeter according to claim 8 in which said metal A is copper and said metal B is constantan.

10. A differential calorimeter according to claim 8 in which said fins extend the length of said cells.

11. A differential calorimeter according to claim 8 constructed in two symmetrical halves.

References Cited by the Examiner

UNITED STATES PATENTS

| | | | |
|---|---|---|---|
| 3,022,664 | 2/1962 | Stolwijk | 73—190 |
| 3,059,471 | 10/1962 | Calvet | 73—190 |
| 3,084,534 | 4/1963 | Goton | 73—15 |

FOREIGN PATENTS

| | | |
|---|---|---|
| 953,800 | 5/1949 | France. |

OTHER REFERENCES

White, J. L., et al.: "Application of Differential Thermal Calorimetry to Measurements of Stored-Energy Release of Metals," in The Review of Scientific Instruments, 34(10): pp. 1104–1110, October 1963 (Q 184 R5 in Scientific Library. Copy in 73–15 DTA.)

RICHARD C. QUEISSER, *Primary Examiner.*

J. C. GOLDSTEIN, *Assistant Examiner.*